United States Patent [19]

Nomura et al.

[11] Patent Number: 5,446,365
[45] Date of Patent: Aug. 29, 1995

[54] METHOD AND APPARATUS FOR CONTROLLING A BATTERY CAR

[75] Inventors: Yoshihito Nomura; Koji Endo; Chihiro Okado, all of Tokyo, Japan

[73] Assignees: Kabushiki Kaisha Toshiba, Kawasaki; Hino Jidosha Kogyo Kabushiki Kaisha, Tokyo, both of Japan

[21] Appl. No.: 62,569

[22] Filed: May 18, 1993

[30] Foreign Application Priority Data

May 19, 1992 [JP] Japan .................................. 4-125263

[51] Int. Cl.$^6$ ............................................. H02J 7/00
[52] U.S. Cl. ........................................ 320/14; 320/15
[58] Field of Search .................... 320/14, 60, 61, 62, 320/64, 3, 4, 13, 15; 318/375, 376; 290/50

[56] References Cited

U.S. PATENT DOCUMENTS

| | | | |
|---|---|---|---|
| 4,054,826 | 10/1977 | Wahlstrom | 320/61 |
| 4,330,742 | 5/1982 | Reimers | 320/14 |
| 4,689,531 | 8/1987 | Bacon | 320/14 X |
| 4,963,811 | 10/1990 | Weber | 320/14 X |
| 5,053,632 | 10/1991 | Suzuki et al. | |
| 5,119,010 | 6/1992 | Shirata et al. | 320/15 |
| 5,260,637 | 11/1993 | Pizzi | 320/15 X |

FOREIGN PATENT DOCUMENTS

| | | | |
|---|---|---|---|
| 280478 | 8/1988 | European Pat. Off. | |
| 418995 | 3/1991 | European Pat. Off. | |
| 0271072 | 11/1990 | Japan | 290/50 |
| 0633751 | 12/1982 | Switzerland | 320/5 |

Primary Examiner—Kristine L. Peckman
Attorney, Agent, or Firm—Oblon, Spivak, McClelland, Maier & Neustadt

[57] ABSTRACT

A method of controlling a battery car in which a motor is driven by a battery and the battery is charged with regeneration power generated by deceleration torque comprises the steps of charging a large-capacitance capacitor connected in parallel with the battery and the motor while restricting a current flowing from the battery to the large-capacitance capacitor, when the voltage of the large-capacitance capacitor is lower than a first voltage, charging the battery to a preset voltage while restricting a current flowing from the large-capacitance capacitor to the battery, when a charging voltage of the large-capacitance capacitor is increased above a predetermined voltage by the regeneration power, and driving the motor with only the charge stored in the large-capacitance capacitor, when the voltage of the large-capacitance capacitor is at least a second voltage.

10 Claims, 4 Drawing Sheets

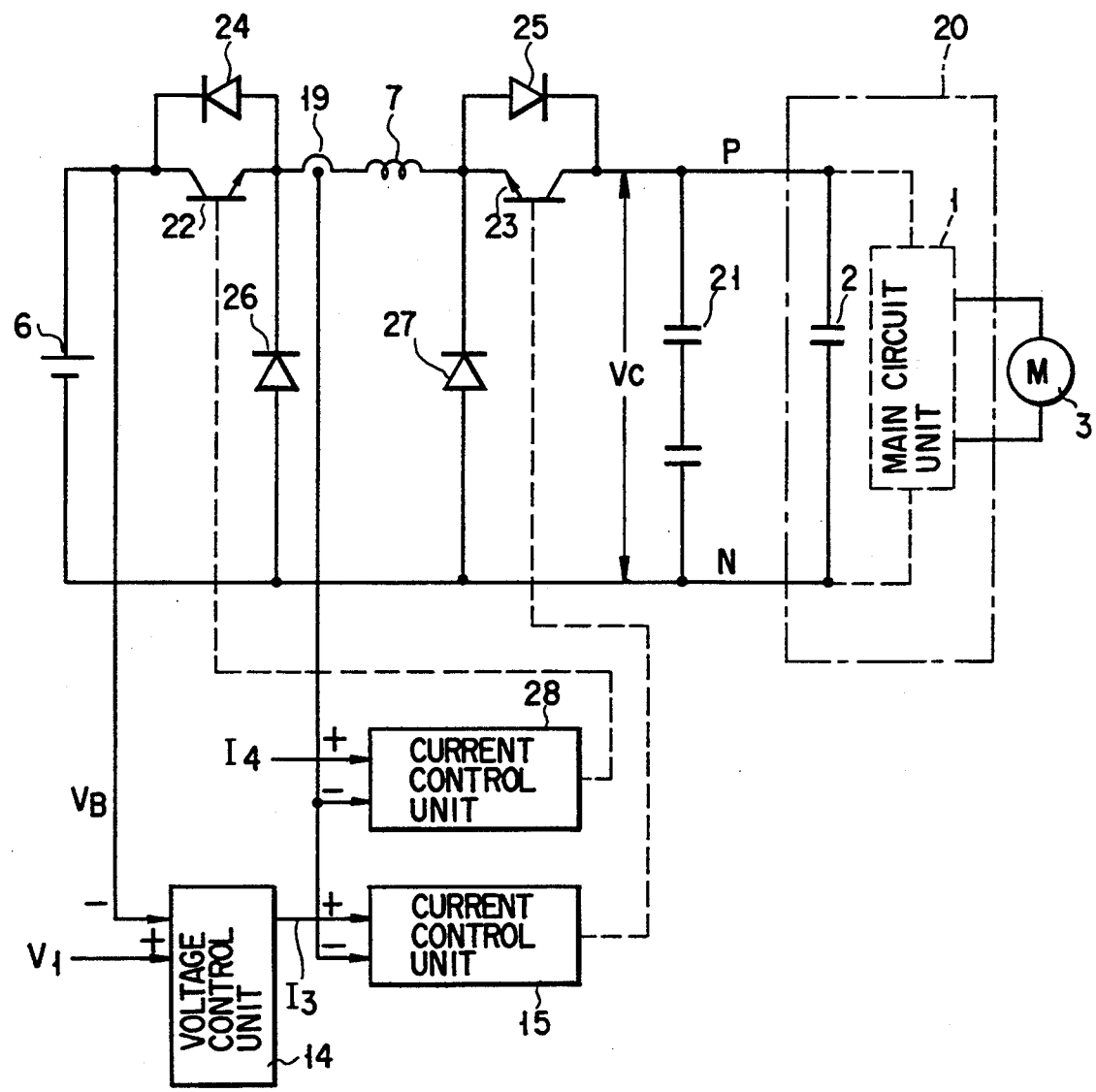
F I G. 2

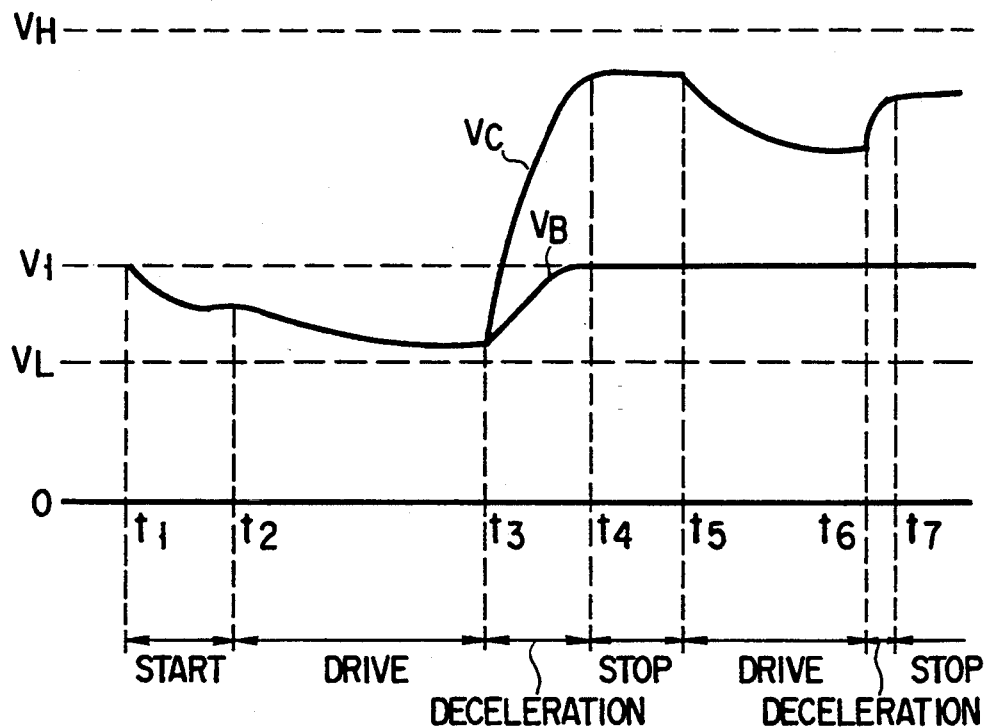
F I G. 3
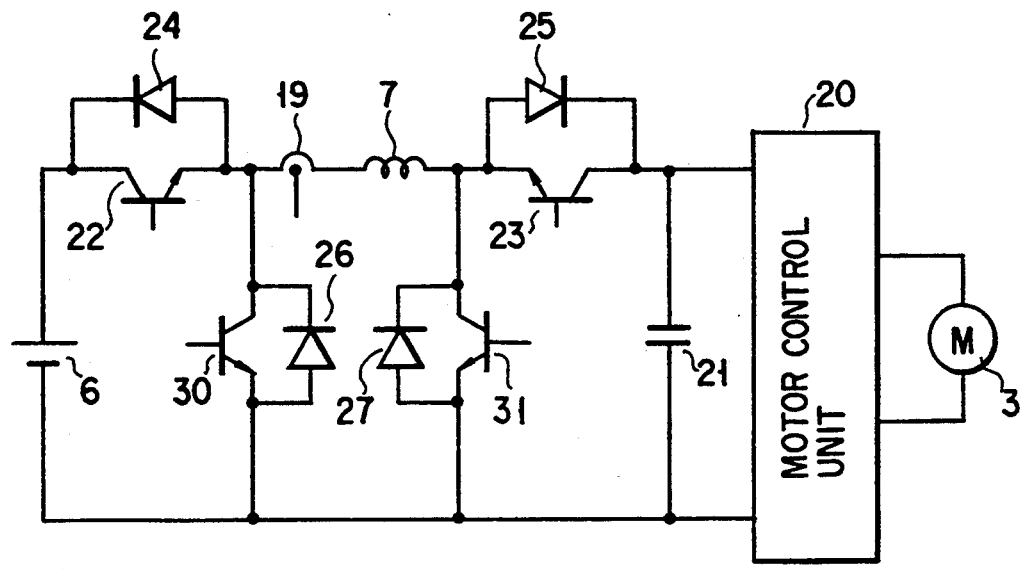
F I G. 4

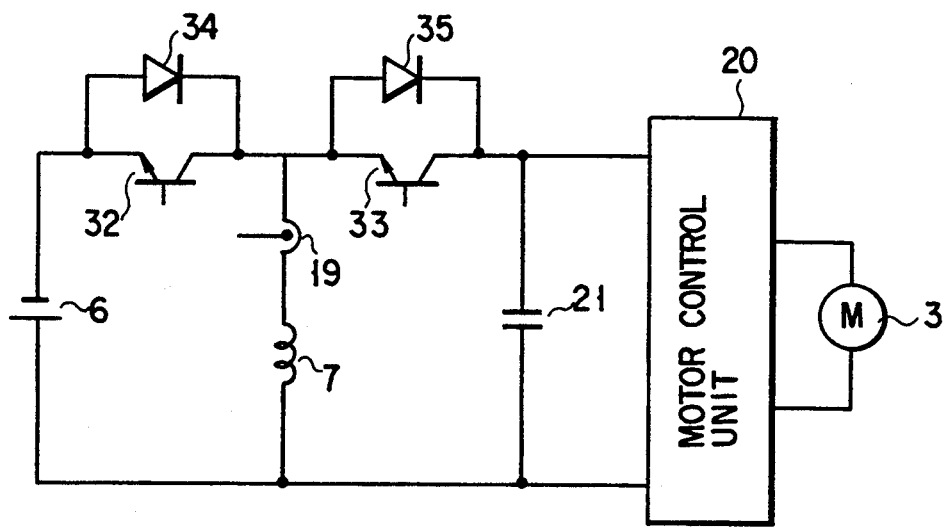
F I G. 5
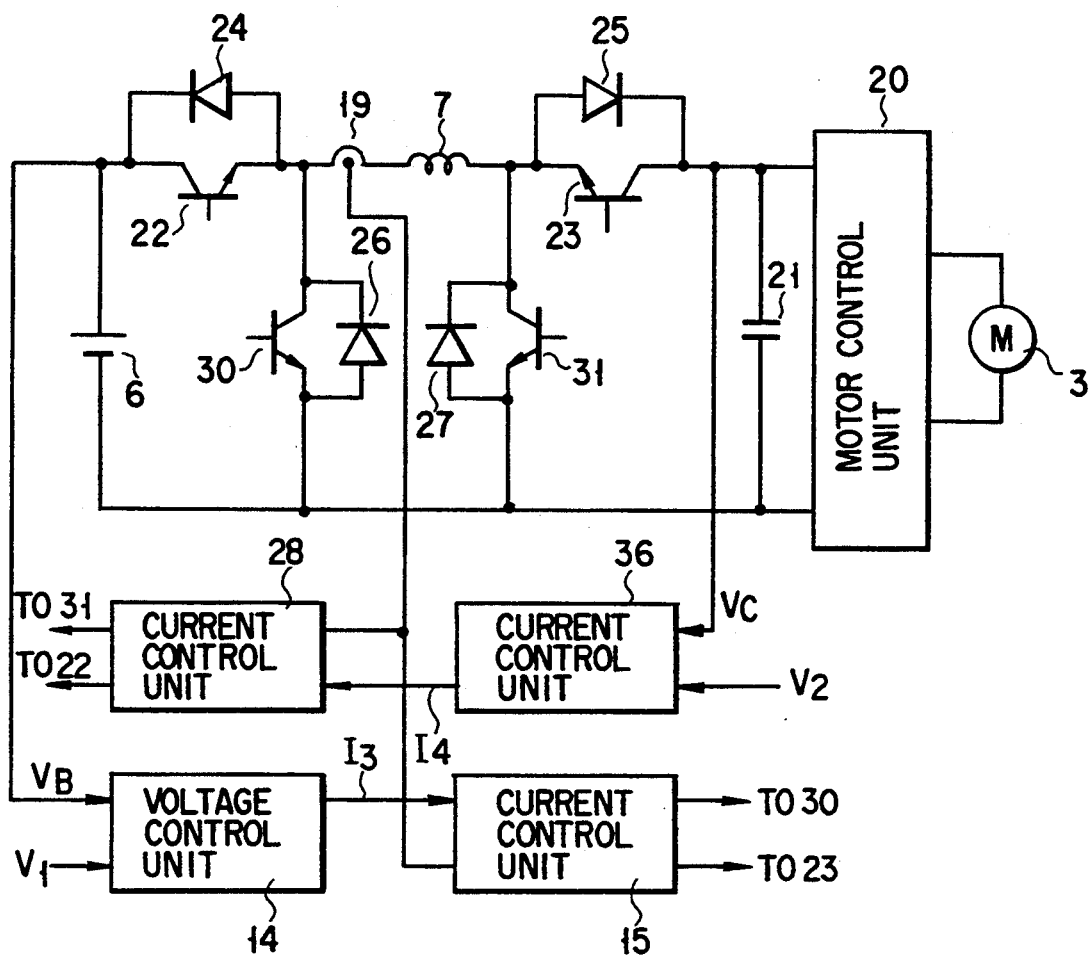
F I G. 6

METHOD AND APPARATUS FOR CONTROLLING A BATTERY CAR

BACKGROUND OF THE INVENTION

1. Field of the Invention

The present invention relates to a method and apparatus for controlling a battery car driven by a motor using a battery as a power source, and more particularly to a method and apparatus for controlling a battery car in which regeneration power regenerated by deceleration torque is efficiently recovered, and the energy balance is improved.

2. Description of the Related Art

A battery car has been practically used, which is driven by a motor using a battery as a power source. In the apparatus driven by a battery, regeneration power owing to deceleration torque is stored in the battery to improve the energy balance.

FIG. 1 shows a circuit structure of the conventional apparatus driven by a battery. Referring to FIG. 1, a main circuit unit 1 supplies a variable current to a DC motor 3 from a substantially constant DC power source charged in a capacitor 2 and a battery 6. The polarity and amount of the current are determined by a reference current $I_1$ input through a current control unit 4 and an input value from a current detection unit 5, based on the extent to which an accelerator pedal or brake pedal is stepped on. The main circuit unit 1, the capacitor 2, and the current control unit 4 constitute a motor control unit 20.

When the apparatus is actuated, a switch 9A is closed by an initial charge control unit 8, with the result that the capacitor 2 is charged by the battery 6 through a reactor 7, the switch 9A, a current limiting resistor 10, and a diode 11. When the capacitor 2 is substantially fully charged, a switch 9B is closed, thereby electrically connecting the battery 6 and the capacitor 2.

When the motor 3 is actuated and motoring is performed, since driving power is supplied from the battery 6 to the motor 3 through the main circuit unit 1, the voltage of the battery 6 is gradually decreased.

When the motor is decelerated while being rotated at a high speed, the voltage of the capacitor 2 is increased to a higher level than that of the battery 6 by regeneration power from the main circuit unit 1. Therefore, charging current flows to the battery 6 through a switch element 12, a diode 13, and the reactor 7. At this time, the charging current is determined by a reference current 13 output from the voltage control unit 14 and limited to or lower than the allowable charging current of the battery 6. When the voltage of the battery 6 reaches a predetermined voltage $V_1$ presenting full charging states, the voltage control unit 14 set the value of a current 13 to 0, thereby turning off the switch element 12 to stop charging the battery 6. In this state, if regeneration power is generated, the charging voltage of the capacitor 2 is further increased. When the charging voltage of the capacitor 2 reaches a predetermined voltage, a voltage detection unit 16 is operated to output an ON command to a switch element 17, thereby allowing a current to flow through a discharge resistor 18. Thus, the capacitor 2 is prevented from overvoltage.

The conventional apparatus as described cannot efficiently recover the regeneration power for the following reasons: When the battery 6 is fully charged, the voltage of the capacitor 2 is increased and the regeneration power is discharged as heat energy through the discharge resistor 18. Even when the battery is not fully charged, if the motor 3 is decelerated rapidly and a too great regeneration power which exceeds the allowable charging current of the battery 6 is generated in a short period of time, the voltage of the capacitor 2 is increased and the excess regeneration power is discharged as heat energy through the discharge resistor 18.

U.S. Pat. No. 5,053,632 discloses a technique related to the present invention, wherein an engine and a motor are used together.

SUMMARY OF THE INVENTION

An object of the present invention is to provide a method and apparatus for controlling a battery car in which regeneration power is efficiently recovered, thereby improving the energy balance.

According to a first aspect of the present invention, there is provided a method of controlling a battery car in which a motor is driven by a battery and the battery is charged with regeneration power generated by deceleration torque, the method comprising the steps of:

charging a large-capacitance capacitor connected in parallel by a motor driving unit for driving the motor while restricting a current flowing from the battery to the large-capacitance capacitor, when the voltage of the large-capacitance capacitor is lower than a first voltage;

charging the battery to a preset voltage while restricting a current flowing from the large-capacitance capacitor to the battery, when the charging voltage of the large-capacitance capacitor is increased above a predetermined second voltage by the regeneration power; and driving the motor with only the charge stored in the large-capacitance .capacitor, when the voltage of the large-capacitance capacitor is at least the second voltage.

According to a second aspect of the present invention, there is provided a control apparatus for controlling a battery car including a motor driven by a battery and a motor control means for charging the battery with regeneration power generated by deceleration torque of the motor, the apparatus comprising:

a large-capacitance capacitor, connected in parallel with the motor control means and the battery, for supplying power to the motor control means;

a first current control means, connected between the battery and the large-capacitance capacitor, for controlling a current flowing from the battery to the large-capacitance capacitor; and a second current control means, connected in series with the first current control means between the battery and the large-capacitance capacitor, for controlling a current flowing from the large-capacitance capacitor to the battery.

According to the present invention, since regeneration power is fully recovered by an electric double-layered capacitor having a large capacitance, the energy balance is improved. In addition, the electric double-layered capacitor charges and discharges relatively large current and can be used in a portion where charging and discharging operations are performed frequently. Therefore, since the frequency of charge and discharge of the battery is reduced, the lifetime of the battery is increased.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a circuit diagram showing a control apparatus of a battery car according to an embodiment of the present invention;

FIG. 3 is a diagram showing an operation of the control apparatus of a battery car according to the present invention;

FIGS. 4 and 5 are circuit diagrams showing a control apparatus of a battery car of the present invention, using a chopper circuit; and FIG. 6 is a circuit diagram showing a control apparatus of a battery car of the present invention, using a voltage control unit for controlling the voltage of the electric-double layered capacitor.

DETAILED DESCRIPTION OF THE PREFERRED EMBODIMENTS

Figure 1:
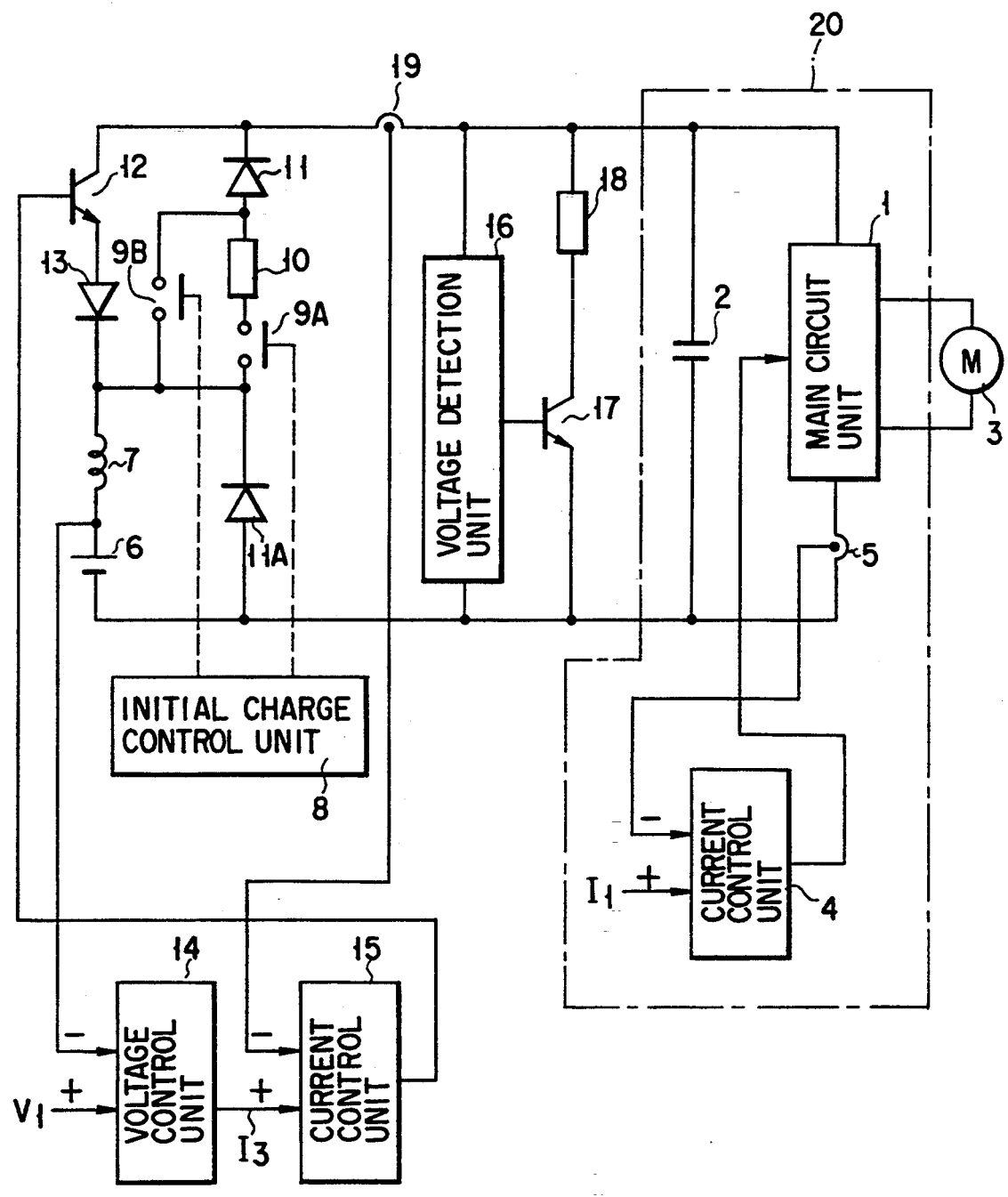
FIG. 1 is a circuit diagram showing a conventional battery car.

An embodiment of the present invention will now be described with reference to the accompanying drawings.

FIG. 2 is a schematic circuit diagram showing a control apparatus of a battery car according to an embodiment of the present invention.

In FIG. 2, the same elements as shown in FIG. 1 illustrating conventional art are identified with the same reference symbols as used in FIG. 1, and detailed explanations thereof are omitted. Although the motor control unit 20 of FIG. 2 has the same structure as in the conventional circuit of FIG. 1, the current control unit 4 therein is not depicted.

According to the present invention, a motor 3 is not directly driven by a battery 6, but by an electric double-layered capacitor 21. The electric double-layered capacitor 21, which has been put to practical use recently, has a large capacitance, i.e., 1000 times or greater than that of the capacitor 2 of the conventional circuit shown in FIG. 1. The electric double-layered capacitor 21 is connected in parallel on a bus line P-N of the DC main circuit, as shown in FIG. 2.

Diodes 24 and 25 are inverse-parallel connected to switch elements 22 and 23, respectively. The switch elements 22 and 23 are connected in series via a reactor 7 between the battery 6 and the positive electrode of the electric double-layered capacitor 21. The switch element 22 allows a current to flow only from the battery 6 to the electric double-layered capacitor 21 and the switch element 23 allows a current to flow only from the electric double-layered capacitor 21 to the battery 6. Diodes 26 and 27 serve to allow a free wheel current to flow during a PWM (pulse width modulation) control.

A current control unit 28 turns on/off the switch element 22 to control a current supplied from the battery 6 to the electric double-layered capacitor 21.

A bipolar transistor, MOSFET, IGBT, or Static Inductor thyristor can be used as the switch elements 22 and 23.

When the apparatus of the above described structure starts operating, the current control unit 28 compares a current value detected by a current detection unit 19 with a predetermined reference current $I_4$ to perform a PWM control of the switch element 22. As a result of the PWM control of the switch element 22, the current supplied from the battery 6 to the electric double-layered capacitor 21 is controlled to be the value of the current 14 or less. Since the current is thus controlled by the current control unit 28 and the switch element 22, the current of the electric double-layered capacitor 21 and the capacitor 2 being the discharge current of the battery 6 is not over the current $I_4$, the double-layered capacitor 21 is charged with a constant current ($I_4$) until the charging voltage reaches the battery voltage $V_B$.

As the charging voltage $V_C$ of the electric double-layered capacitor 21 approaches the battery voltage $V_B$, the difference therebetween is reduced, so that the reference current 14 cannot flow. As a result, the difference between the reference current $I_4$ and the current detected by the current detection unit 19 is increased. In this state, the current control unit 28 stops the PWM current control, thereby turning off the switch element 22. Thus, an initial charging operation is completed.

After the initial charging operation is completed as described above, the motor 3 is driven in the same manner as in the conventional apparatus mainly by the charge (sometimes called "energy") stored in the electric double-layered capacitor 21.

When the motor 3 is rotated at a desired rate and deceleration torque is generated, regeneration power is generated from the main circuit unit 1 and a charging current flows through the electric double-layered capacitor 21, with the result that the charge stored in the capacitor 21 is increased. When the charge is increased and the charging voltage of the electric double-layered capacitor 21 becomes higher than the voltage of the battery 6, the charging current flows through the battery 6 via the switch element 23, the reactor 7, and the diode. 24. The charging current is controlled to be a reference current 13 by means of the current control unit 15 by the PWM control of the switch element 23. When the battery voltage $V_B$ of the battery 6 reaches the predetermined voltage $V_1$, the voltage control unit 14 outputs the reference current $I_3$ of 0 to the current control unit 15, thereby turning off the switch element 23 to cease the charging of the battery 6. The maximum value of the reference current $I_3$ is limited to or less than the allowable charging current of the battery 6 in the same manner as in the conventional apparatus.

When the battery car runs on a long downward slope, the motor 3 generates braking torque, and regeneration power is generated by the main circuit unit 1, so that the charge stored in the electric double-layered capacitor 21 may be greater than the charge stored in the initial charging operation. In this case, the battery 6 is fully charged and excess charge is stored only in the double-layered capacitor 21. As a result, the charging voltage $V_C$ of the electric double-layered capacitor 21 becomes greater than the battery voltage $V_B$. The charging energy of electric double-layered capacitor 21 is discharged as heat energy by a discharge resistor (not shown), in the same manner as in the conventional apparatus, before it exceeds the rated voltage of the main circuit element. Thus, the electric double-layered capacitor 21 is prevented from overcharge.

After the initial charging operation is completed, if the electric double-layered capacitor 21 is fully charged, the motor is driven only by the charge stored in the electric double-layered capacitor 21.

FIG. 3 shows an example of change of the battery voltage $V_B$ and the charging voltage $V_C$ of the electric double-layered capacitor 21 while the battery car is driven.

Assume that both the battery voltage $V_B$ and the charging voltage $V_C$ of the capacitor are equal to the predetermined voltage $V_1$ of the battery, at a time $t_1$, i.e., the apparatus is in the state where the initial charging operation has been completed.

When the motor 3 is activated at the time $t_1$, since the switch element 22 is in an ON state, the battery voltage $V_B$ and the charging voltage $V_C$ are gradually decreased. When the motor starts motoring at a time $t_2$, the battery voltage $V_B$ and the charging voltage $V_C$ are further decreased. When deceleration running is started at a time $t_3$, the electric double-layered capacitor 21 is charged by regeneration power supplied from the main circuit unit 1, with the result that the voltage $V_C$ of the electric double-layered capacitor 21 becomes greater than the battery voltage $V_B$. Accordingly, the charging current flows from the electric double-layered capacitor 21 to the battery 6, and the battery voltage $V_B$ is gradually increased to the specified voltage $V_1$. In this case, if the deceleration running is performed on a steep downward slope, a greater regeneration current is generated and the capacitor voltage $V_C$ is increased as shown in FIG. 3 until a time $t_4$ when the battery car is stopped. If the voltage $V_C$ of the electric double-layered capacitor 21 exceeds the rated voltage $V_H$ of the main circuit, the regeneration power is discharged by the discharging resistor (not shown), so that the voltage $V_C$ is limited below the rated voltage $V_H$ of the main circuit.

In a period from the time $t_4$ to a time $t_5$, the battery car is stationary. In this state, the voltage $V_C$ of the electric double-layered capacitor 21 is maintained at a substantially constant value. When the motor 3 restarts motoring, the motor 3 is driven only by the charge stored in the electric double-layered capacitor 21 and only the voltage $V_C$ of the capacitor 21 is reduced. When a declaration operation starts at a time $t_6$, regeneration power is generated by the main circuit unit 1 and the capacitor 21 is charged with the regeneration power. Therefore, the voltage $V_C$ of the electric double-layered capacitor 21 is increased again until a time $t_7$ when the battery car is stopped.

As described above, according to the present invention, since regeneration power is recovered efficiently in the electric double-layered capacitor 21, the energy balance is improved. The electric double-layered capacitor 21 allows a relatively large charge/discharge current to flow therethrough, it can be used a position where charging or discharging is performed frequently.

In the above embodiment, the switch element 22 is kept on even after the initial charging operation is completed. However, it can be turned off at the time $t_1$ and restart a PWM control when the charging voltage $V_C$ of the electric double-layered capacitor 21 is reduced to the voltage $V_L$, so that energy is discharged from the battery 6. With this method, the number of charging/discharging operations of the battery 6 can be reduced, thereby prolonging the lifetime of the battery 6.

FIGS. 4 and 5 show chopper circuits which can be used as a main circuit for transferring energy between the battery 6 and the electric double-layered capacitor 21. In FIGS. 4 and 5, the elements shown in FIG. 2 are identified with the same reference numerals as in FIG. 2 and detailed descriptions thereof are omitted. FIGS. 4 and 5 show only main portions which differ from FIG. 2.

The circuit shown in FIG. 4 differs from that of FIG. 2 only in that switch elements 30 and 31 are additionally provided. In this circuit, energy is transferred in the following manner.

In the circuit of FIG. 4, when energy is transferred from the battery 6 to the electric double-layered capacitor 21, the switch elements 23 and 30 are turned off and the switch elements 22 and 31 are turned on/off by the PWM control. When energy is transferred from the electric double-layered capacitor 21 to the battery 6, the switch elements 22 and 31 are turned off and the switch elements 23 and 30 are turned on/off by the PWM control. With this operation, the battery 6 and the electric double-layered capacitor 21 are charged with a desired voltage, independent of the voltages of the battery 6 and the electric double-layered capacitor 21.

The circuit shown in FIG. 5 differs from that of FIG. 2 in that the polarity of the battery 6 is reversed, the reactor 7 is connected in parallel with switch elements 32 and 33, and the switch element 32 has a function which differs from that of the switch element 22.

In the circuit of FIG. 5, when energy is transferred from the battery 6 to the electric double-layered capacitor 21, the switch element 33 is turned off and the switch element 32 is turned on/off. When energy is transferred from the electric double-layered capacitor 21 to the battery 6, the switch element 32 is turned off and the switch element 33 is turned on/off.

A voltage control unit 36 for controlling the voltage of the electric double-layered capacitor 21 may be provided in the above circuit shown in FIG. 4 or 5. In this case, the output of the voltage control unit 36 is supplied as the reference current $I_4$ shown in FIG. 2 to a current control unit 28. This arrangement is shown in FIG. 6. With this circuit arrangement, since rated voltages of the battery 6 and the electric double-layered capacitor 21 can be set to desired values, a convenient control apparatus can be obtained. To apply the control circuit shown in FIG. 6 to the circuit shown in FIG. 5, it is only necessary to connect outputs of the current control units 15 and 28 with the switch elements 33 and 32, respectively.

Although the DC motor 3 is used in the above embodiment, it can be replaced by an AC motor. In this case, an inverter which can perform power-regenerating operation is used as the motor control unit 20.

In the above embodiment, the battery car is driven and stopped only by means of the motor 3. However, the motor 3 may be used as a driving means auxiliary to an engine (internal-combustion engine), as mentioned in the description of the related art. Alternatively, the motor 3 may be used as a main driving means with an engine as an auxiliary driving means.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of controlling a car in which a motor is driven by a battery and the battery is charged with regeneration power generated by deceleration torque, said method comprising the steps of:

charging, using regeneration power, a large-capacitance capacitor connected in parallel with a motor driving unit for driving the motor and the battery while restricting a current flowing from the battery to the large-capacitance capacitor, when a voltage of the large-capacitance capacitor is lower than a first voltage;

charging the battery to a preset voltage while restricting a current flowing from the large-capacitance capacitor to the battery, when a charging voltage of the large-capacitance capacitor is increased above a predetermined second voltage by the regeneration power; and driving the motor with only a charge stored in the large-capacitance capacitor, when the voltage of the large-capacitance capacitor is equal to or higher than the predetermined second voltage.

2. A control apparatus for controlling a car including a motor driven by a battery and a motor control means for charging the battery with regeneration power generated by deceleration torque of said motor, said apparatus comprising:

a large-capacitance capacitor, connected in parallel with said motor control means and the battery, for supplying power to said motor control means;

a first current control means, connected between said battery and said large-capacitance capacitor, for controlling a current flowing from said battery to said large-capacitance capacitor; and a second current control means, connected in series with said first current control means between said battery and said large-capacitance capacitor, for controlling a current flowing from said large-capacitance capacitor to said battery.

3. A control apparatus according to claim 2, further comprising a voltage control means for comparing a voltage of said battery with a reference voltage and for outputting a reference current.

4. A control apparatus according to claim 3, wherein said second current control means includes:

a current control unit for producing an output on the basis of the current flowing from said large-capacitance capacitor to said battery and said reference current output from said voltage control means; and a switch element having two main circuits and a control terminal for controlling passage of a current flowing between said two main circuits on the basis of the output from said current control unit.

5. A control apparatus according to claim 2, wherein said large-capacitance capacitor is constituted by an electric double-layered capacitor.

6. A control apparatus according to claim 2, wherein said second current control means includes:

a current control unit for producing an output on the basis of the current flowing from said battery to said large-capacitance capacitor and a reference current; and a switch element having two main circuits and a control terminal for controlling passage of a current flowing between said two main circuits on the basis of the output from the current control unit.

7. A control apparatus according to claim 6, further comprising a voltage control means for comparing a voltage of said large-capacitance capacitor with a preset second voltage and for outputting the reference current to said current control unit of said second current control means.

8. A control apparatus according to claim 2, wherein said car includes an internal combustion engine, and said motor is connected to said internal combustion engine of said car and adds an auxiliary torque to said internal combustion engine.

9. A control apparatus according to claim 2, further comprising a voltage control means for comparing a voltage of said large-capacitance capacitor with a preset voltage and for outputting a reference current to a current control unit of said second current control means.

10. A control apparatus according to claim 9, wherein said current control unit is for producing an output on the basis of the current flowing from said battery to said large-capacitance capacitor and said reference current; and wherein said second current control means further includes:

a switch element having two main circuits and a control terminal for controlling passage of a current flowing between said two main circuits on the basis of the output from the current control unit; and

* * * * *